US011127310B1

(12) United States Patent
Pruitt-Guy

(10) Patent No.: US 11,127,310 B1
(45) Date of Patent: *Sep. 21, 2021

(54) PENMANSHIP DEVICE TO ASSIST STUDENTS WITH DYSLEXIA

(71) Applicant: Jane Ethel Pruitt-Guy, Hayward, CA (US)

(72) Inventor: Jane Ethel Pruitt-Guy, Hayward, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/821,993

(22) Filed: Mar. 17, 2020

Related U.S. Application Data

(63) Continuation of application No. 15/673,391, filed on Aug. 9, 2017, now Pat. No. 10,593,228.

(51) Int. Cl.
*G09B 11/00* (2006.01)
*G09B 11/04* (2006.01)

(52) U.S. Cl.
CPC ..................... *G09B 11/00* (2013.01)

(58) Field of Classification Search
CPC ................. G09B 11/00; G09B 11/04
USPC .............. 434/85, 87, 88, 162, 163, 164, 165
See application file for complete search history.

(56) References Cited

U.S. PATENT DOCUMENTS

| | | | | |
|---|---|---|---|---|
| 217,736 A * | 7/1879 | Kibbe | .................... | B43L 7/0275 |
| | | | | 33/474 |
| 1,253,758 A * | 1/1918 | Wilkes | ................... | G09B 11/04 |
| | | | | 434/162 |
| 1,324,182 A | 12/1919 | Spaull | .......................... | 434/162 |
| 2,041,993 A * | 5/1936 | Cousins | ................ | B43L 13/208 |
| | | | | 33/564 |
| 2,183,063 A | 12/1939 | Dorsey | .......................... | 33/494 |
| 3,731,402 A * | 5/1973 | Paul | ....................... | G09B 11/04 |
| | | | | 434/164 |
| 3,774,319 A | 11/1973 | Sprowls | ........................... | 35/37 |
| 3,869,813 A | 3/1975 | Hancy | ............................... | 35/37 |
| 4,003,143 A * | 1/1977 | Keitzer | ................ | G09B 21/002 |
| | | | | 434/117 |
| 4,170,833 A | 10/1979 | Quinn et al. | ........................ | 35/36 |
| 4,262,422 A * | 4/1981 | Pass | ..................... | B43L 13/201 |
| | | | | 33/41.2 |
| 4,315,748 A | 2/1982 | Frascara et al. | .............. | 434/159 |
| 4,650,423 A | 3/1987 | Sprague et al. | .............. | 434/156 |
| 4,679,328 A | 7/1987 | Saad | .............................. | 33/447 |
| 4,916,826 A * | 4/1990 | McKeown | ............ | B43L 13/208 |
| | | | | 33/564 |

(Continued)

*Primary Examiner* — Kurt Fernstrom
(74) *Attorney, Agent, or Firm* — Adibi IP Group, PC; Amir V. Adibi; Andrew C. Palmer

(57) ABSTRACT

A penmanship device is provided to assist students learning to write consistently and evenly. The device comprises a body with a handle portion and an operational portion. The operational portion has at least two windows. A first window is used for alignment and a second window is used to write. A user writes a first letter of a first word within the confines of the second window. To write the next letter, the device is shifted so that an edge of the previous letter is aligned with a left lateral edge of the second window. This is repeated until the word is completed. To write the next word, the device is shifted so that an edge of a last letter of the previous word is aligned with a right lateral edge of the first window. In another embodiment, the device has three windows providing left-handed and right-handed support.

18 Claims, 8 Drawing Sheets

TOP VIEW OF PENMANSHIP DEVICE
(FIRST EMBODIMENT)

(56) References Cited

U.S. PATENT DOCUMENTS

| | | | | |
|---|---|---|---|---|
| 5,027,523 | A | * | 7/1991 | MacLeod .................. G09B 1/06 |
| | | | | 33/564 |
| 5,169,316 | A | | 12/1992 | Lorman et al. ................ 434/185 |
| 5,203,706 | A | * | 4/1993 | Zamir ....................... G09B 1/16 |
| | | | | 434/159 |
| 5,426,859 | A | * | 6/1995 | Concari .................. B43L 7/005 |
| | | | | 33/27.02 |
| 5,615,485 | A | * | 4/1997 | Stoneberg .............. B43L 9/007 |
| | | | | 33/27.01 |
| 5,616,032 | A | * | 4/1997 | Keitzer .................. G09B 11/04 |
| | | | | 434/117 |
| 5,769,639 | A | | 6/1998 | Foster ............................ 434/159 |
| 5,788,503 | A | | 8/1998 | Shapiro et al. ............... 434/172 |
| 5,797,751 | A | | 8/1998 | Quarles ......................... 434/162 |
| D398,250 | S | * | 9/1998 | Dietterich ...................... D10/62 |
| D398,864 | S | * | 9/1998 | Dietterich ...................... D10/62 |
| 5,899,698 | A | | 5/1999 | Sandlin ......................... 434/157 |
| 5,993,217 | A | | 11/1999 | Perry ............................ 434/113 |
| 6,030,225 | A | | 2/2000 | Chan ............................. 434/159 |
| 6,142,783 | A | * | 11/2000 | Rocha ................... G09B 11/00 |
| | | | | 434/162 |
| 6,536,126 | B2 | | 3/2003 | Wilson ............................. 33/477 |
| 6,669,478 | B2 | | 12/2003 | Edwards et al. ............. 434/159 |
| 6,829,990 | B2 | * | 12/2004 | Cochran ................ B41L 13/10 |
| | | | | 101/127.1 |
| 7,371,026 | B2 | | 5/2008 | Berger .............................. 401/8 |
| 7,717,713 | B2 | | 5/2010 | Wescott et al. ............... 434/162 |
| 7,743,522 | B2 | * | 6/2010 | Ruzio ..................... B25H 7/02 |
| | | | | 33/492 |
| 8,995,770 | B2 | | 3/2015 | Kennard et al. ............. 382/187 |
| 2015/0201734 | A1 | | 7/2015 | Yamasaki .................... 132/200 |
| 2015/0239279 | A1 | | 8/2015 | Kubota ............................ 74/89 |

* cited by examiner

PERSPECTIVE VIEW OF PENMANSHIP DEVICE

TOP VIEW OF PENMANSHIP DEVICE
(FIRST EMBODIMENT)

EXPANDED TOP VIEW OF OPERATIONAL PORTION
OF PENMANSHIP DEVICE

METHOD OF USING THE PENMANSHIP DEVICE

DRAW STRAIGHT LINE USING PENMANSHIP DEVICE

WRITE LETTER OF A WORD IN A SECOND WINDOW OF
THE PENMANSHIP DEVICE

WRITE NEXT LETTER OF WORD IN THE SECOND WINDOW OF
THE PENMANSHIP DEVICE

WRITE LETTER OF NEXT WORD IN THE SECOND WINDOW OF THE PENMANSHIP DEVICE

DONE WRITING LINE USING PENMANSHIP DEVICE

DRAW NEXT STRAIGHT LINE USING PENMANSHIP DEVICE

METHOD OF MANUFACTURING A PENMANSHIP DEVICE

PACKAGED PENMANSHIP DEVICE

METHOD OF MANUFACTURING A PENMANSHIP DEVICE
(LEFT OR RIGHT HANDED EMBODIMENT)

PENMANSHIP DEVICE TO ASSIST STUDENTS WITH DYSLEXIA

CROSS-REFERENCE TO RELATED APPLICATIONS

This application is a continuation of, and claims the benefit under 35 U.S.C. § 120 from, nonprovisional U.S. patent application Ser. No. 15/673,391, entitled "Penmanship Device To Assist Students With Dyslexia," filed on. Aug. 9, 2017, now U.S. Pat. No. 10,593,228. The subject matter of the foregoing document is expressly incorporated herein by reference.

TECHNICAL FIELD

The described embodiments relate generally to writing devices, and more particularly to a penmanship device to assist students with dyslexia.

BACKGROUND INFORMATION

There have been many attempts to provide a device to assist students in writing. U.S. Pat. No. 4,170,833, which issued to Quinn et al., discloses a calligraphic lettering kit with a ruling guide to help with the correct proportions of the letter and an overlay with guidelines for spacing. U.S. Pat. No. 4,679,328, which issued to Saad, discloses a writing template with a slotted lettering guide that assists with the parallel relationship of the writing on a piece of paper that is disposed beneath the device. U.S. Pat. No. 5,797,731, which issued to Quarles, discloses a method for teaching students how to write evenly spaced words by using a spacer. U.S. Pat. No. 7,717,713, which issued to Wescott et al., discloses a writing guide system comprising a sheet with depressed areas in the shape of alphanumeric characters. While there are many devices which assist with writing letters or assist with penmanship techniques, none suitably assists the writing of students with dyslexia. A more robust solution that overcomes these challenges is desired.

SUMMARY

A penmanship device comprises a rectangular body with a handle portion and an operational portion. The penmanship device is usable by dyslexic students to assist with writing evenly and consistently. The operational portion has at least two windows. The windows provide the students with the ability to focus on one character at a time and help with correct spacing. The penmanship device and method of use can also be used to teach students how to write numbers or sequences of other characters that dyslexic students might find challenging.

The penmanship device has a first side, a second side, a third side, and a fourth side. The first and second sides are longer than the third and fourth sides. The first side and the second side are opposite each other and extend a first distance in a parallel fashion. The third side and the fourth side are opposite each other and extend a second distance in parallel fashion. In one example, the first distance is more than two times the second distance. In one example, the first distance is more than between two and eight times the second distance.

The operational portion of the penmanship device comprises a first window and a second window. The second window is used to write letters such that the pencil is inserted within the confines of the second window and a letter is written. The second window is used for alignment. The windows are also referred to as openings, cavities, gaps, or fenestrations. The first window has an upper edge, a lower edge, a first lateral edge (or left edge), and a second lateral edge (or right edge). The first window has a first width and a first height. The second window has an upper edge, a lower edge, a first lateral edge (or left edge), and a second lateral edge (or right edge). The first window and second window are adjacent to each other. The second lateral edge of the first window is a third distance from the first lateral edge of the second window. In one embodiment, the first window has smaller dimensions than the dimensions of the second window. In other embodiments, the windows are the same size.

Dyslexic students can use the penmanship device to write evenly and consistently by writing letters within the confines of the second window using the edges of the second window as a guide. Dyslexic students learning to write often find it difficult to write letters of consistent sizes and spacing and to write words that are spaced evenly apart. Prior to writing a letter within the second window, the bottom edge of the second window is aligned with a first alignment axis. If ruled paper is used, the first alignment axis is aligned with the ruled line. If ruled paper is not used, then a straight line is optionally drawn using a side of the penmanship device as a straight edge. The optionally drawn line is used to indicate the first alignment axis. After the bottom edge of the second window is aligned with the first alignment axis, a letter is written within the confines of the second window.

To write subsequent characters in a word, the penmanship device is shifted along the sheet of paper. The penmanship device is shifted until the first lateral edge of the second window is aligned with an edge of the previously written character along a second alignment axis. The first lateral edge of second window is disposed along the second alignment axis. Next, a subsequent character is written within the confines of the second window. Use of the penmanship device in this manner provides consistent spacing between each letter and consistent sizes of each letter.

To draft a new word, the penmanship device is shifted such that an edge of the last character in the previous word is aligned with the second lateral edge of the first window along a third alignment axis. The second lateral edge of first window is disposed along the third alignment axis. After the last letter of the previous word is aligned with the second lateral edge of the first window, a first letter of the next word is written within the confines of the second window. Use of the penmanship device in this way provides consistent spacing between each word.

The first window and the second window are part of a writing guide used to write letters of consistent letter size, consistent letter spacing, and consistent word spacing. Use of the writing guide yields letters of consistent letter size such that all letters are no larger than the second window because each letter is written within the confines of the second window. Use of the writing guide yields consistent letter spacing such that each space between letters of a word is no great than a width of the second window. Use of the writing guide yields consistent word spacing such that each space between words written on the same line is no great than a distance between the adjacent lateral sides of the first window and the second window.

In accordance with one novel aspect, the penmanship device is provided with a third window that is adjacent to the second window. The third window supports both left-handed and right-handed students. For example, in the case of a right-handed student, the first window (the window to the left of the larger second window) is used for alignment and the second window is used for writing letters. In the case of a left-handed student, the third window (the window to the right of the larger second window) is used for alignment and the second window is used for writing letters. The penmanship device is a dual-functioning device for both left-handed and right-handed students having three and only three openings. In another embodiment, the penmanship device is specifically manufactured for left-handed use only or right-handed use only. In a right-handed only embodiment, the penmanship device has only the first window and the second window. In a left-handed only embodiment, the penmanship device has only the second window and the third window.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the Invention.

Reference will now be made in detail to some embodiments of the invention, examples or which are illustrated in the accompanying drawings.

DETAILED DESCRIPTION

Figure 1:
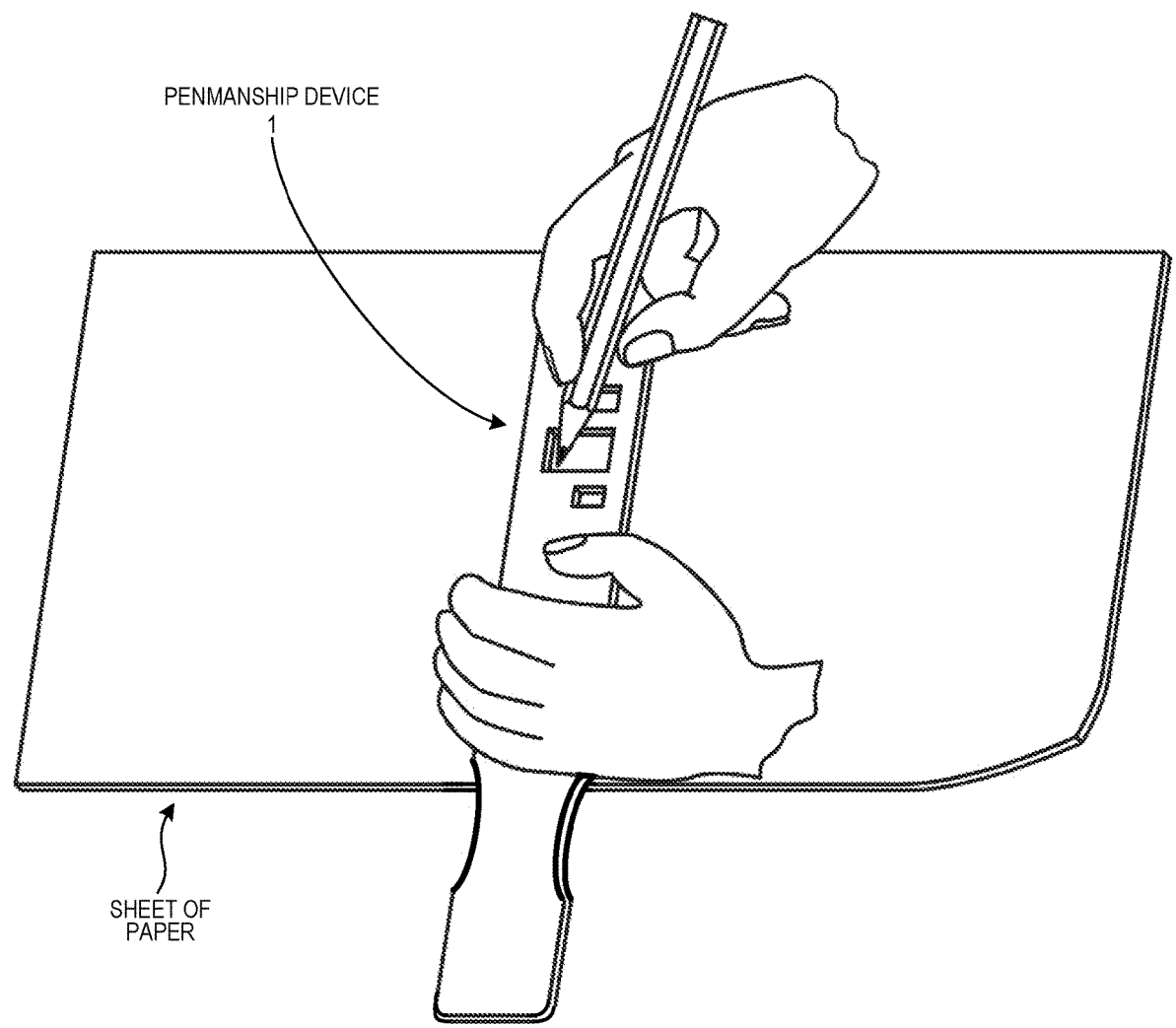
FIG. 1 is a diagram of a perspective view of the penmanship device 1.

FIG. 1 is a diagram of a perspective view of how a penmanship device 1 is used by a user to write. The surface for the penmanship device 1 is typically an 8½ inch×11 inch sheet of paper. The sheet of paper is ruled paper with straight line markings or an unruled sheet with no markings. The penmanship device 1 also works with other forms of paper like 8½×14 legal paper, index cards, poster board, index cards, foldable cards, or any suitable writing surface. In the example of FIG. 1, the user is right-handed. The penmanship device 1 has three windows and is also usable by a left-handed user. The penmanship device 1 is placed flat on the sheet of paper. Letters are written in the center window and the windows adjacent to the center window are used for alignment.

Figure 2:
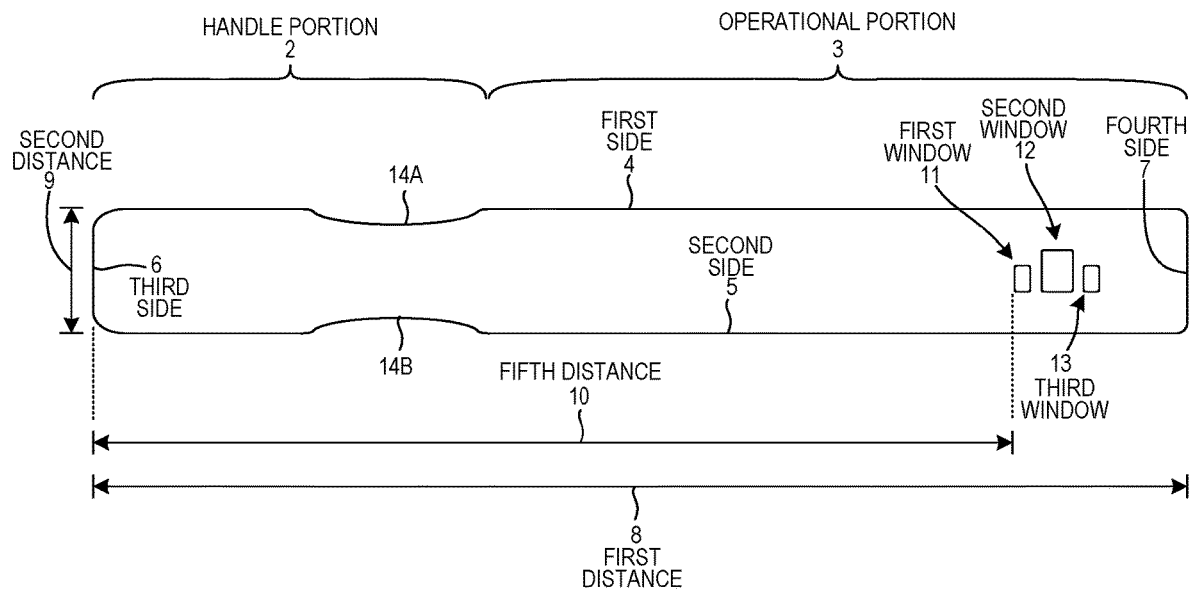
FIG. 2 is a diagram of a top view of the penmanship device 1.

FIG. 2 is a diagram of a top view of the penmanship device 1. The penmanship device 1 comprises a body with a first side 4, second side 5, third side 6, fourth side 7, a handle portion 2, and an operational portion 3. The first side 4 and the second side 5 are opposite each other and extend in parallel a first distance 8. The third side 6 and the fourth side 7 are opposite each other and extend in parallel a second distance 9. In this example, the first distance 8 is approximately 11.0 inches and the second distance 9 is approximately 1⅛ inches. The penmanship device 1 has a thickness of 1/16 an inch. The penmanship device 1 is manufactured from wood, rubber, injection molded plastic, metal, or made of any suitable material in this example, the penmanship device 1 is made from a single unitary structure that has windows punched out of an end opposite the handle portion 2. The penmanship device 1 of FIG. 2 is flexible and permits a center of the device 1 to bend at least one inch from a normal position.

The handle portion 2 has a first side contour 14A and a second side contour 14B. The operational portion 3 of the penmanship device 1 has a first window 11, second window 12, and third window 13. The windows may also be referred to as openings, cavities, gaps, or fenestrations. The first window 11 is adjacent to the second window 12. The second window 12 is adjacent to the third window 13. In this example, second window 12 has larger dimensions than the first window 11 and the third window 13. In another embodiment, each of the first window 11, the second window 12, and the third window 13 has the same dimensions.

Figure 3:
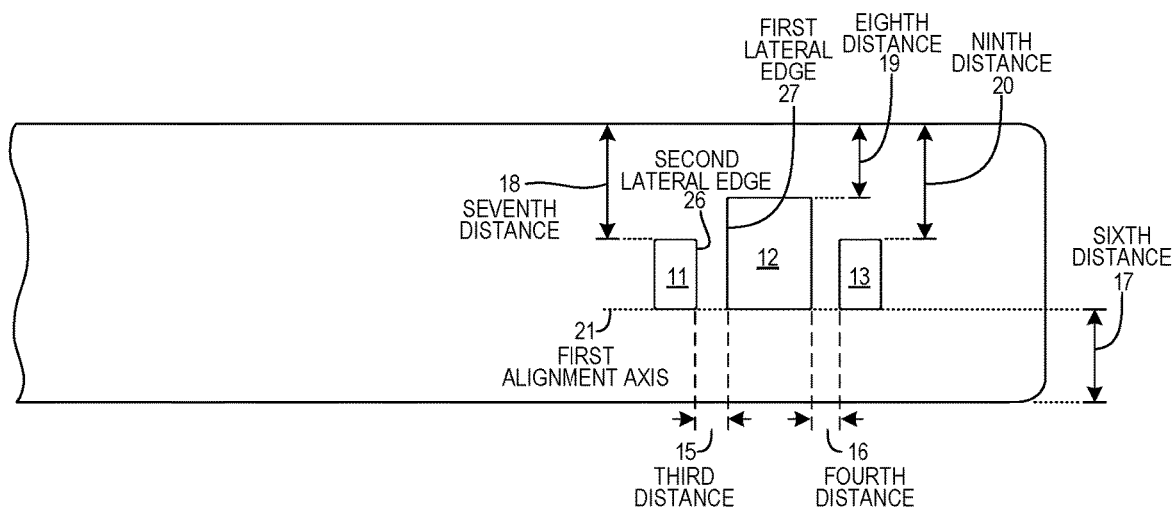
FIG. 3 is a diagram of an expanded view of the expanded view of the operational portion 3 of the penmanship device 1.

FIG. 3 is a diagram of an expanded top view of the operational portion 3 of the penmanship device 1. The first window 11 has an upper edge, a lower edge, a first lateral edge (or left edge), and a second lateral edge (or right edge). Reference numeral 26 identifies the second lateral edge of the first window 11. The first window 11 has dimensions comprising a height and a width. In this example, the height of the first window 11 is 5/16 of an inch and the width of the first window 11 is 3/16 of an inch. The second window 12 has an upper edge, a lower edge, a first lateral edge (or left edge), and a second lateral edge (or right edge). Reference numeral 27 identifies the first lateral edge of the second window 12. The second window 12 has dimensions comprising a height and a width. In this example, the height of the second window 12 is ¼ of an inch and the width of the second window 12 is ⅜ of an inch. The third window 13 has an upper edge, a lower edge, a first lateral edge (or left edge), and a second lateral edge (or right edge). The third window 13 has dimensions comprising a height and a width. In this example, the third window 13 has the same dimensions as the first window 11.

The second window 12 is disposed adjacent to and between the first window 11 and the third window 13. The second lateral edge 26 of the first window 11 is a third distance 15 from the first lateral edge 27 of the second window 12. In this example, the third distance 15 is 3/16 of an inch. The third distance 15 is substantially equal to the width of the first window 11. In other embodiments, the third distance 15 is less than a width of the first window. As explained below, the third distance 15 will be the spacing between words when the penmanship device 1 is used in accordance with a novel method of use.

The second lateral edge of the second window 12 is a fourth distance 16 from the first lateral edge of the third window 13. In this embodiment, the third distance 15 and fourth distance 16 are equal. The third side 6 of the penmanship device 1 is a fifth distance 10 from the first lateral edge of the first window 11. In this example, the fifth distance 10 is 9⅛ inches. The lower edge of the first window 11, the lower edge of the second window 12, and the lower edge of the third window 13 are a sixth distance 17 from the second side 5 of the penmanship device 1. In this example, the sixth distance 17 is 7/16 of an inch.

The upper edge of the first window 11 is a seventh distance 18 from the first side 4 of the penmanship device 1. The upper edge of the second window 12 is an eighth distance 19 from the first side 4 of the penmanship device 1. The upper edge of the third window 13 is a ninth distance 20 from the first side 4 of the penmanship device 1. In this example, the seventh distance 18 is ⅜ of an inch, the eighth distance 19 is ¼ of an inch, and the ninth distance 20 is ⅜ of an inch.

Figure 4:
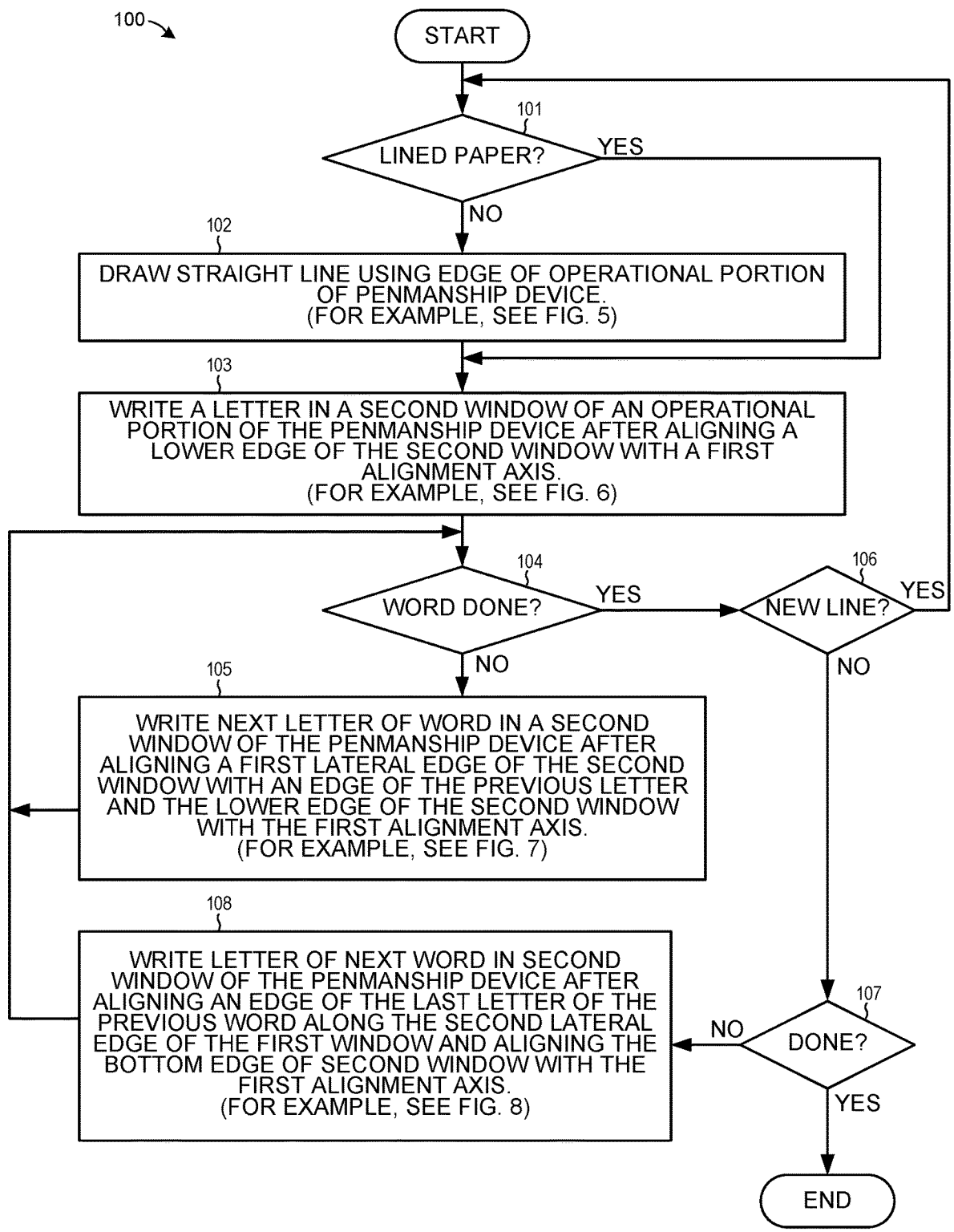
FIG. 4 is a flowchart describing the method of using the penmanship device 1.

FIG. 4 is a flowchart of a method 100 of using a penmanship device in accordance with a first novel aspect. In a first step (step 101), a determination is made as to whether a sheet of paper used as a writing medium is ruled (has lined indications) or is not ruled. If a user determines that the sheet of paper is not ruled, then the user draws a straight line in step 102. If, on the other hand, the user determines that the sheet of paper is ruled, then the user begins writing with the penmanship device in step 103 using the ruled lines.

In a second step (step 102), an edge of a penmanship device is used to draw a straight line. For example, in FIG. 5, penmanship device 1 is used as a straight edge to draw straight line 29. The straight line 29 will assist the user in writing words that are aligned.

In a third step (step 103), a first letter of a word is written in a second window of an operational portion of the penmanship device after aligning a lower edge of the second window with the straight a first alignment axis. For example, in FIG. 6, a first letter ("J") of a word is written in a second window 12 of an operational portion 3 of the penmanship device 1. The first letter ("J") is written within the confines of the second window 12 after the lower edge of the second window is aligned with a first alignment axis 21. The straight line 29 is drawn along the first alignment axis 21 and is used to indicate the first alignment axis 21.

In a fourth step (step 104), a determination is made as to whether a word being written is complete or whether additional letters are to be written to complete the word. If the word is not completed, then a next letter of the word is written in a fifth step (step 105). In the fifth step (step 105), a next letter of the word is written within the second window of the penmanship device after aligning a first lateral edge of the second window with an edge of the previous letter and the lower edge of the second window with the straight line. The first lateral edge of the second window extends along a second alignment axis. The fifth step (step 105) is repeated until the word is completed. For example, in FIG. 7, the next letter ("a") is written within the confines of the second window after the lower edge of the second window is aligned with first alignment axis 21 (using the straight line 29 as a guide) and after aligning the first lateral edge 27 with a right edge of the previous letter ("J"). Each letter is of the word is written as in the fifth step (step 105) until the word ("Jane") is written.

If, on the other hand, it is determined in step 104 that the word is completed, then a determination is made in a sixth step (step 106) as to whether a new line of text is to be written. If it is determined in the sixth step (step 106) that a new line is to be written, then the method proceeds to the first step (step 101). If, on the other hand, it is determined in the sixth step (step 106) that no new line is to be written, then a determination is made at a seventh step (step 107) as to whether the writing is complete. If it is determined in the seventh step (step 107) that the writing is not complete and more is to be written, then the method proceeds to the eighth step (step 108) of writing the next word.

In the eighth step (step 108), a next word is to be written adjacent to a previous word. A letter of the next word is written within the confines of the second window of the penmanship device after aligning an edge of the last letter of the previous word along the second lateral edge of the first window and after aligning the bottom edge of second window with the first alignment axis. For example, in FIG. 8, the penmanship device 1 is aligned in accordance with the step 108 before a letter ("G") of the next word ("Guy") is written. The penmanship device 1 is aligned such that the second lateral edge of the first window 11 is aligned with an edge of the last letter ("G") of the previous word ("Guy"). The second lateral edge of the first window 11 extends along a third alignment axis 23. After each letter, the method proceeds to the fourth step (step 104) to determine whether the word is done.

Figure 5:
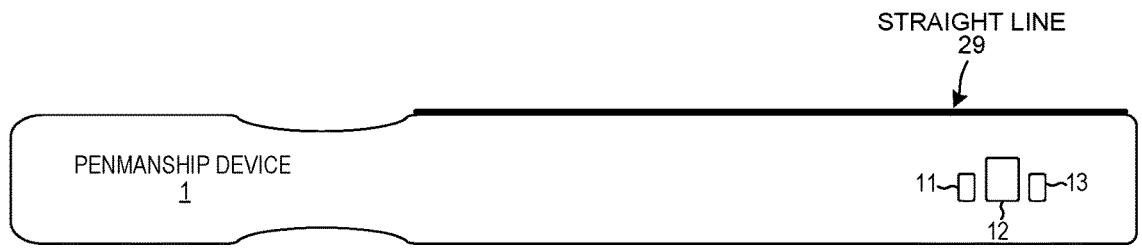
FIG. 5 is a diagram illustrating a straight line 29 drawn using the penmanship device 1.

FIG. 5 is a diagram of how a straight line 29 can be drawn using the operational portion 3 of the penmanship device 1.

Figure 6:
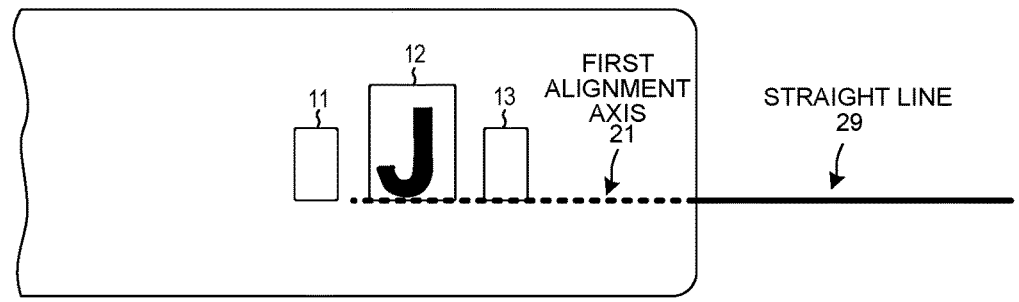
FIG. 6 is a diagram of a first letter written using the penmanship device 1.

FIG. 6 is a diagram showing how to write a first letter of a word using the penmanship device 1. First, the penmanship device 1 is aligned by aligning the lower edge of the second window 12 with the first alignment axis 21. The straight line 29 extends along the first alignment axis 21 and is used as a guide. Next, after the penmanship device 1 is appropriately aligned, the first letter ("J") is written into the second window 12.

Figure 7:
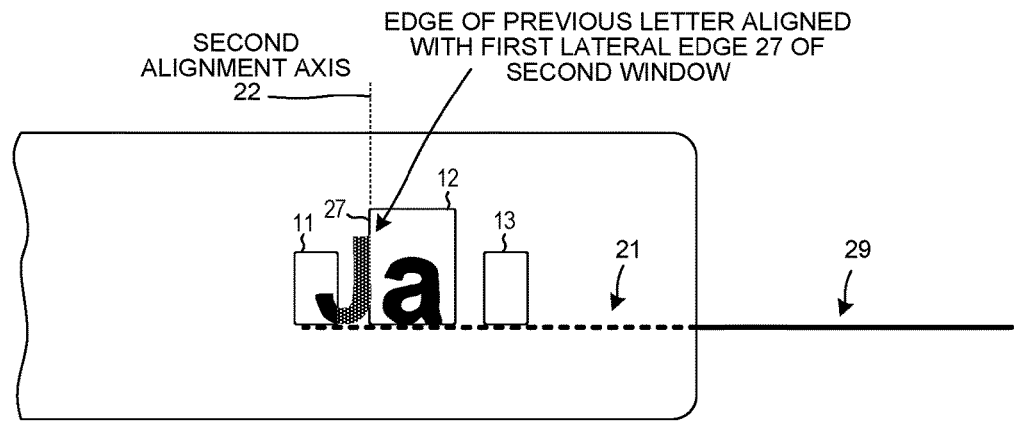
FIG. 7 is a diagram of the next letter written using the penmanship device 1.

FIG. 7 is a diagram showing how to write the next letter in the word using the penmanship device 1. First, the penmanship device 1 is aligned by aligning the right edge of the previous letter with a first lateral edge 27 of the second window 12. The first lateral edge 27 extends along a second alignment axis 22. The second window 12 provides consistent size of letters and consistent spacing between letters.

Figure 8:
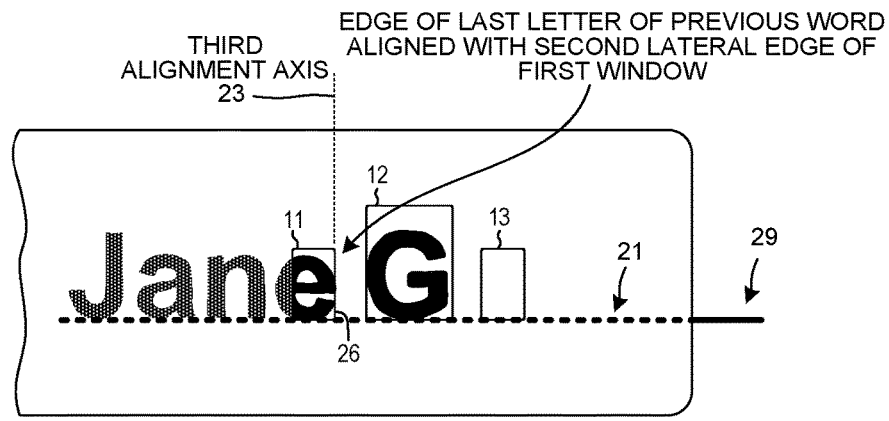
FIG. 8 is a diagram of the first letter of the next word written using the penmanship device 1.

FIG. 8 is a diagram showing how to write a new word adjacent to the previous word using the penmanship device 1. First, the lower edge of the second window 12 is aligned along the first alignment axis 21. Next, an edge of the last letter ("e") of the previous word ("Jane") is aligned with the second lateral edge 26 of the first window 11. The second lateral edge 26 extends along a third alignment axis 23. Next, a first letter ("G") of the next word ("Guy") is written within the second window 12.

Figure 9:
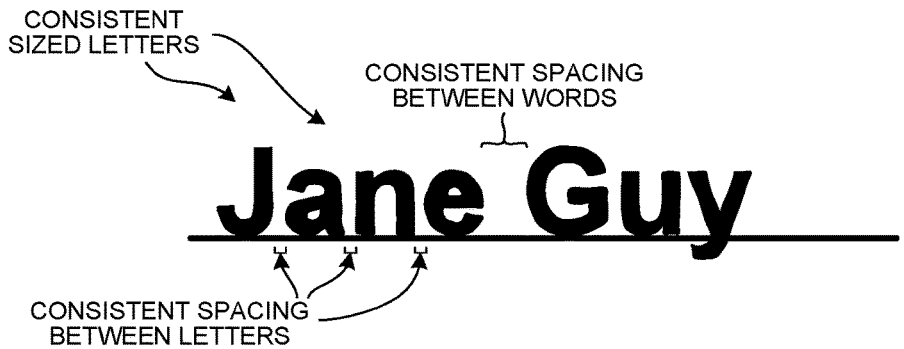
FIG. 9 is a diagram of the finished writing using the penmanship device 1.

FIG. 9 is a diagram of the completed line of text ("Jane Guy"). Use of the penmanship device 1 yields consistently sized letters, consistent spacing between letters, and consistent spacing between words. In addition, each of the words is aligned along the first alignment axis 21. If the penmanship device 1 is used correctly, then the third distance 15 will be the distance between words. In one example, the third distance 15 is the same as a width of the first window 11.

Figure 10:
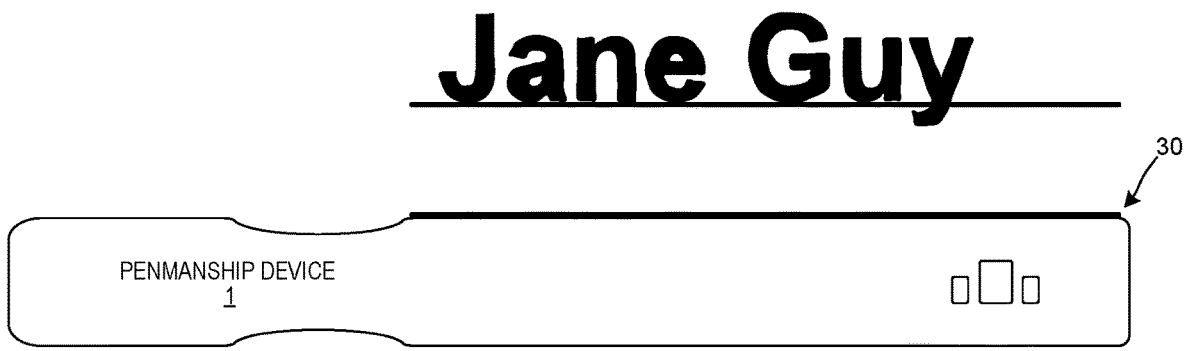
FIG. 10 is a diagram of a new straight line 30 drawn using the penmanship device 1.

FIG. 10 is a diagram showing how the penmanship device 1 is used to draw a new straight line 30 for writing another line of text.

Figure 11:
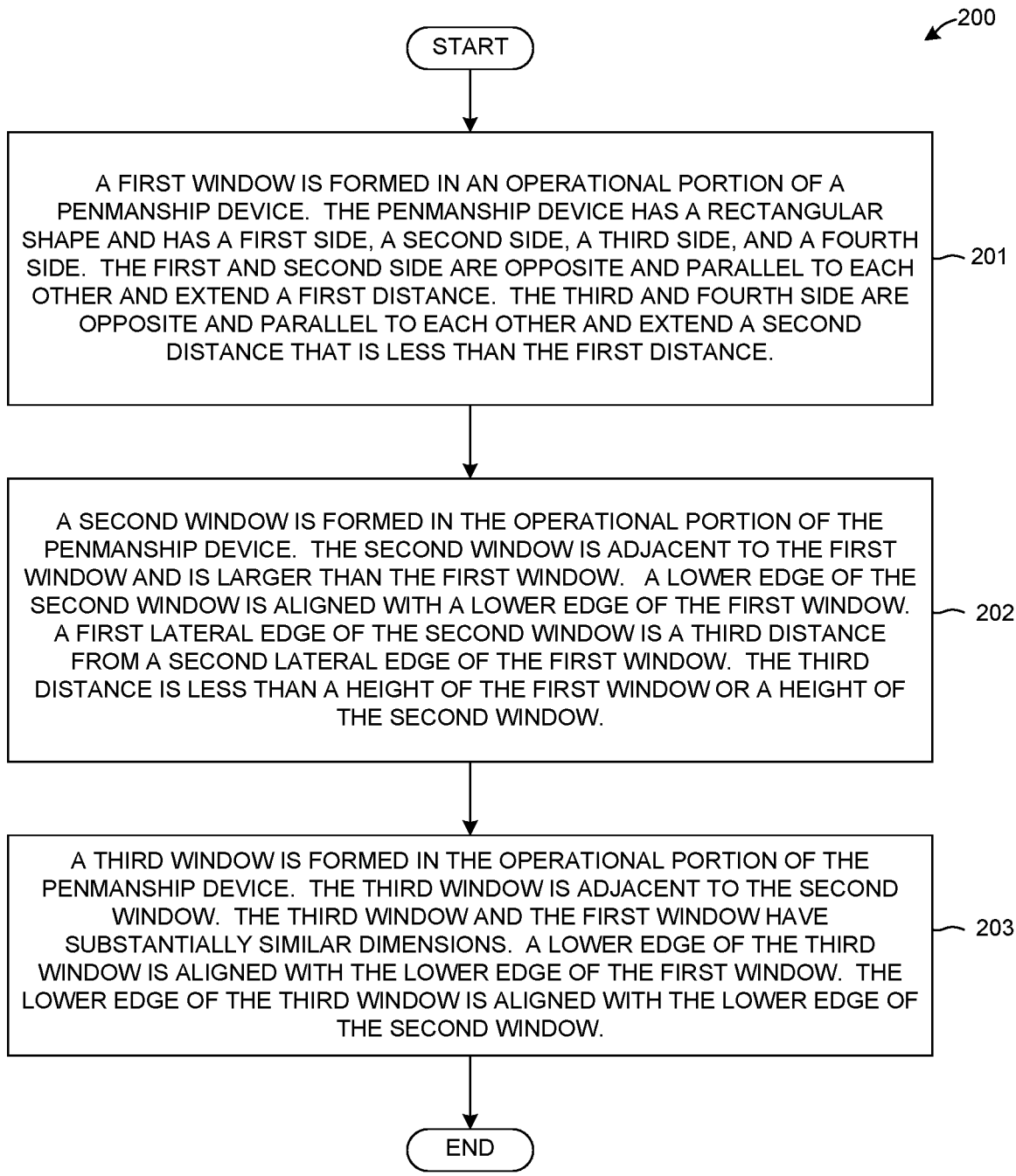
FIG. 11 is a diagram of a method of manufacturing a left and right handed embodiment of the penmanship device 1.

FIG. 11 is a diagram of a method 200 of manufacturing a penmanship device. In a first step (step 201), a first window is formed in an operational portion of a penmanship device. The penmanship device has a rectangular shape and has a first side, a second side, a third side, and a fourth side. The first and second sides are opposite and parallel to each other and extend a first distance. The third and fourth sides are opposite and parallel to each other and extend a second distance that is less than the first distance. For example, in FIG. 2, the first window 11 is formed by forming an opening in the operational portion 3 of the penmanship device 1. The penmanship device 1 is a rectangular structure of wood, rubber, injection molded plastic, metal, 3D printed material, or made of another type of suitable material. In one embodiment, the opening of window 11 is formed during the fabrication process of the rectangular structure. In another embodiment, the opening of window 11 is formed in a subsequent processing step involving a milling, laser cutting, or machine punching to form the opening of window 11.

In a second step (step 202), a second window is formed in the operational portion of the penmanship device. The second window is adjacent to the first window and is larger than the first window. A lower edge of the second window is aligned with a lower edge of the first window. A first lateral edge of the second window is a third distance from a second lateral edge of the first window. The third distance is less than a height of the first window or a height of the second window. In the example of FIG. 3, the second window 12 is formed in the operational portion 3 of the penmanship device 1 to be adjacent to the first window 11. The opening of window 12 is formed in the same fashion as the opening of window 11. Second window 12 is larger than the first window 11. A lower edge of the second window 12 is aligned with a lower edge of the first window 11. A first lateral edge 27 of the second window 12 is a third distance 15 from a second lateral edge 26 of the first window 11. The third distance 15 is less than a height of the first window or a height of the second window. In one example, the third distance 15 is substantially the same as the width of the first window 11. In another, the third distance 15 is less than the width of the first window.

In a third step (step 203), a third window is formed in the operational portion of the penmanship device. The third window is adjacent to the second window and has substantially similar dimensions to the first window. A lower edge of the third window is aligned with the lower edge of the first window. The lower edge of the third window is aligned with the lower edge of the second window. For example, in FIG. 3, a third window 13 is formed in the operational portion 3 of the penmanship device 1. The opening of window 13 is formed in the same fashion as the opening of windows 11 and 12. The third window 13 is adjacent to the second window 12 and has substantially similar dimensions to the first window 11. The lower edges of the first window 11, second window 12, and third window 13 are aligned along the first alignment axis 21.

Figure 12:
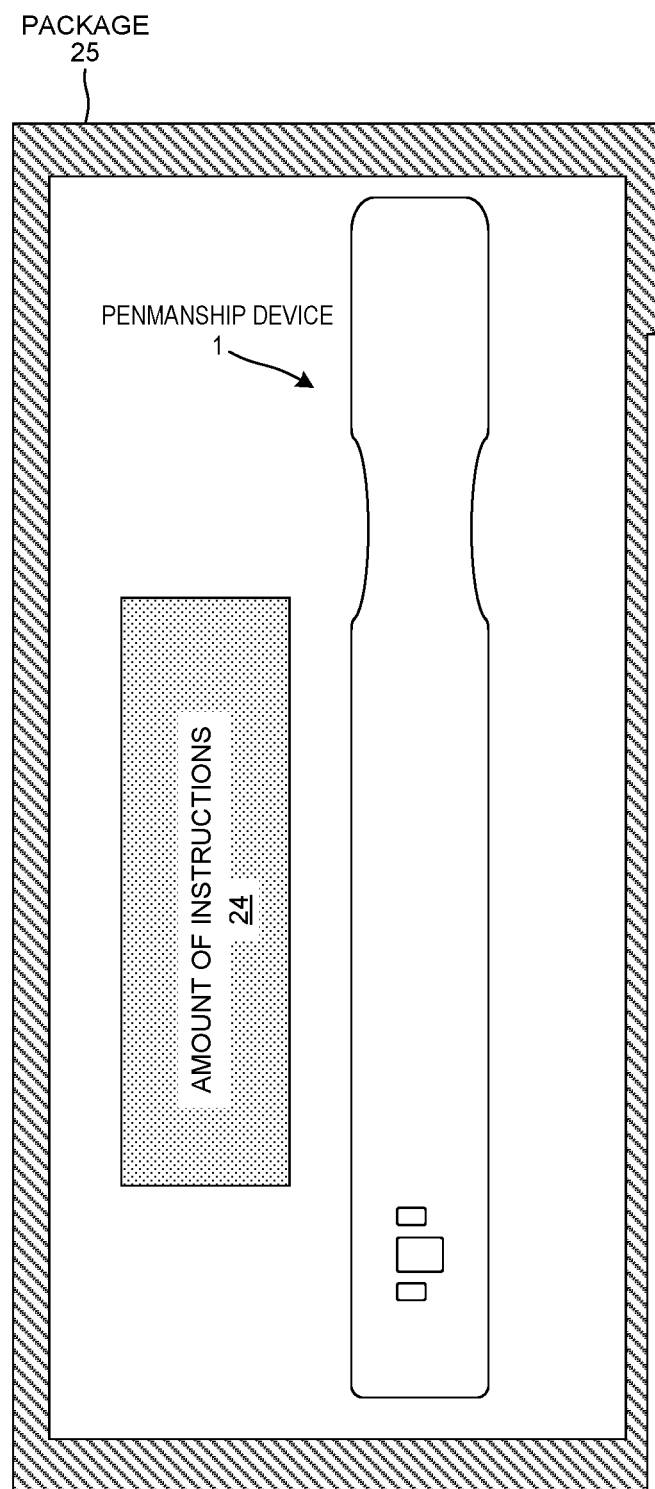
FIG. 12 is a diagram of a package 25 that includes the penmanship device 1 with an amount of instructions 24.

FIG. 12 is a diagram of a package 25 that includes the penmanship device 1 with an amount of instructions 24 for how to use the penmanship device. In another embodiment, the instructions are provided digitally via a website. The user is given a. URL that presents the instructions onto a display viewable by the user's network connected device. In yet another embodiment, the instructions are printed on the package 25. In yet another embodiment, the instructions are digitally provided via QR code that is included with the package 25. The user scans the QR code with a mobile communication handset thereby directing the user to digitally accessible instructions. In yet another embodiment, the instructions are sent to the user via an email communication.

In one example, a first entity manufactures and packages the device as shown in FIG. 12. The first entity distributes the packaged penmanship device to a second entity. The second entity is an educational entity having students that are to use the penmanship device. The second entity is, for example, a school, university, tutoring center, library, or special needs learning facility. The second entity provides the penmanship device to students.

In another example, the first entity manufactures and packages the device as shown in FIG. 12 and distributes the packaged penmanship device to a second entity that sells the packaged penmanship device. The second entity is a sales or distribution entity. The second entity may then sell the packaged penmanship device to a third entity that is an educational entity.

Figure 13:
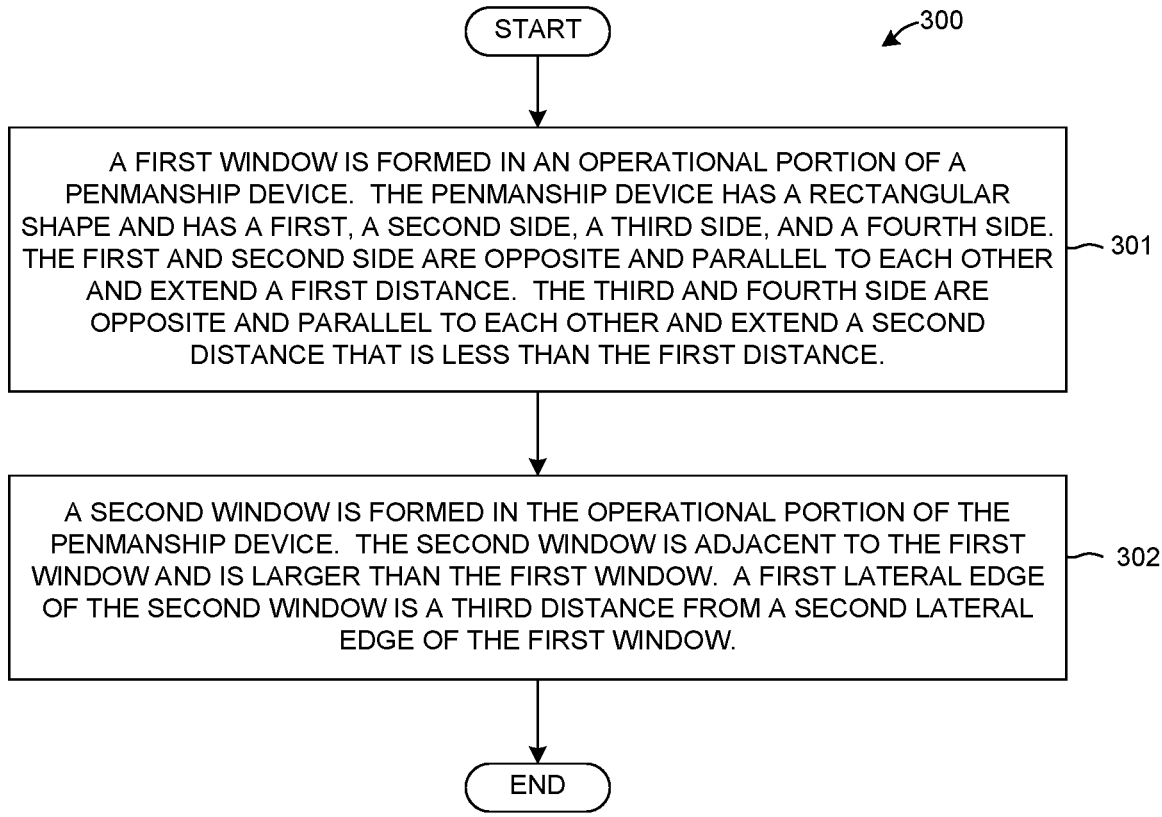
FIG. 13 is a diagram of a method of manufacturing a left-handed or right-handed embodiment of the penmanship device 1 having only two windows.

FIG. 13 is a diagram of another method of manufacturing 300 a penmanship device 1 for left handed or right handed use. The penmanship device formed by method 300 has two and only two windows.

In a first step (step 301), a first window is formed in an operational portion of a penmanship device. The penmanship device is made with a rectangular shape and has a first side, a second side, a third side, and a fourth side. The first side and second side are opposite and parallel to each other and extend a first distance. The third side and fourth side are opposite and parallel to each other and extend a second distance that is less than the first distance.

In a second step (step 302), a second window is formed in the operational portion of the penmanship device. The second window is adjacent to the first window and is larger than the first window. The second window is adjacent to the first window and is larger than the first window. A first lateral edge of the second window is a third distance from a second lateral edge of the first window. The first distance is at least twenty times the third distance. The third distance indicates the spacing between words when the penmanship device is used in accordance with the novel method 100.

Although the present invention has been described is connection with certain specific embodiments for instructional purposes, the present invention is not limited thereto. For example, in another embodiment, the penmanship device is formed from two or more different structures that are attached together. The penmanship device has two separate components that attach together and swivel about a hinge. To store the device, the two components swivel towards each other making the device compact. To use the device, the two components swivel away from each other into an open position and can be used for writing. In addition, in other embodiments, the windows of the penmanship device are all the same size. For example, the penmanship device may have three and only three windows and all three windows are the same size. In another example, the penmanship device may have two and only two windows and both windows are the same size. Accordingly, various modifications, adaptations, and combinations of various features of the described embodiments can be practiced without departing from the scope of the invention as set forth in the claims.

What is claimed is:

1. A device comprising:
  a body, wherein the body extends a first distance in length and a second distance in width, wherein the first distance is greater than the second distance, and wherein the body comprises:
  a handle portion;

a first window disposed near an end opposite the handle portion, wherein the first window has a first lateral edge, a lower edge, a second lateral edge, and an upper edge, and wherein the first window has a first height and a first width; and a second window, wherein the second window has a first lateral edge, a lower edge, a second lateral edge, and an upper edge, wherein the second window has a second height and a second width, wherein the second window is disposed adjacent to the first window, wherein the first lateral edge of the second window is a third distance from the second lateral edge of the first window, wherein the first distance is at least twenty times the third distance, and wherein the first window and the second window form part of a writing guide.

2. The device of claim 1, wherein the device is a penmanship device, wherein a user writes a word by writing a first letter of the word within the second window along a first alignment axis, wherein the first lateral edge of the second window extends along a second alignment axis, and wherein each subsequent letter of the word is written by aligning an edge of a previous letter with a first lateral edge of the second window and then writing a next letter within the second window.

3. The device of claim 1, wherein the device is a penmanship device, wherein a user writes a next word by aligning a last letter of a previous word with a second lateral edge of the first window, wherein the second lateral edge of the first window extends along a third alignment axis, and wherein after aligning the last letter with the second lateral edge of the first window, the user writes a first letter of the next word within the second window.

4. The device of claim 1, wherein the height of the second window is greater than the height of the first window, wherein the width of the second window is greater than the width of the first window, and wherein the width of the second window is greater than the third distance.

5. The device of claim 1, wherein the width of the first window is substantially equivalent to the third distance.

6. The device of claim 1, wherein the first lateral edge of the first window is a fifth distance from a side of the body, and wherein the fifth distance is more than half of the first distance.

7. The device of claim 1, wherein the lower edge of the first window and the lower edge of the second window are a sixth distance from a side of the body, and wherein the sixth distance is less than half the second distance.

8. The device of claim 1, wherein the upper edge of the first window is a seventh distance away from a side of the body, and wherein the seventh distance is less than half the second distance.

9. The device of claim 1, wherein the upper edge of the second window is an eighth distance away from a side of the body, and wherein the eighth distance is less than one third of the second distance.

10. The device of claim 1, wherein the lower edge of the first window extends along a first alignment axis, and wherein the lower edge of the second window also extends along the first alignment axis such that the lower edge of the first window is aligned with the lower edge of the second window.

11. The device of claim 1, wherein the body further comprises:

a third window, wherein the third window has a first lateral edge, a lower edge, a second lateral edge, and an upper edge, wherein the third window has a height and a width, wherein the third window is disposed adjacent to the second window such that the second window is between the first window and the third window, and wherein the first lateral edge of the third window is a fourth distance from the second lateral edge of the second window.

12. The device of claim 11, wherein the height of the second window is greater than the height of the third window, wherein the height of the second window is greater than the height of the third window, wherein the lower edge of the third window is a sixth distance from a side of the body, wherein the upper edge of the third window is a ninth distance from another side of the body, wherein the sixth distance is less than half the second distance, and wherein the ninth distance is less than half the second distance.

13. A method comprising:

forming a first window on a structure, wherein the first window has a first length and a first width;

forming a second window on the structure, wherein the second window has a second length and a second width, wherein the second window is disposed adjacent to the first window, wherein one side of the second window is a third distance from another side of the first window, wherein the second length of the second window is greater than the first length of the first window, wherein the second width of the second window is greater than the first width of the first window, wherein the second width of the second window is greater than the third distance, wherein the first window and the second window are part of a writing guide, and wherein a length of the structure is more than three times a width of the structure.

14. The method of claim 13, further comprising:

forming a third window on the structure.

15. The method of claim 13, wherein the structure is a rectangular-shaped structure, wherein the rectangular shaped structure has a width, a length, and a thickness, wherein the length is more than twice the width, wherein the width is more than ten times the thickness, and wherein the length is more than ten times the thickness.

16. The method of claim 13, wherein the structure is a unitary piece of wood, rubber, injection molded plastic, metal, or 3D printed material.

17. An apparatus comprising:

a handle portion, wherein the handle portion is disposed along a first end of the apparatus, wherein the apparatus has a length and a width, and wherein the length is more than three times the width; and means for providing a writing guide to write letters of consistent letter size, consistent letter spacing, and consistent word spacing, wherein the means is disposed along a second end of the apparatus, wherein the first end is opposite the second end, wherein the word spacing is a distance, and wherein the length of the apparatus is at least five times the distance.

18. The apparatus of claim 17, wherein the apparatus is a penmanship device, and wherein the means is part of the penmanship device and includes a first window and a second window.

* * * * *